(12) United States Patent
Sun et al.

(10) Patent No.: US 12,379,319 B2
(45) Date of Patent: Aug. 5, 2025

(54) ONLINE DETECTION DEVICE AND METHOD FOR UNDERWATER ELEMENTS BASED ON LIBS TECHNOLOGY

(71) Applicant: SHENYANG INSTITUTE OF AUTOMATION, CHINESE ACADEMY OF SCIENCES, Liaoning (CN)

(72) Inventors: Lanxiang Sun, Liaoning (CN); Haibin Yu, Liaoning (CN); Shuo Li, Liaoning (CN); Zhibo Cong, Liaoning (CN); Yang Li, Liaoning (CN); Wei Dong, Liaoning (CN)

(73) Assignee: SHENYANG INSTITUTE OF AUTOMATION, CHINESE ACADEMY OF SCIENCES, Liaoning (CN)

( * ) Notice: Subject to any disclaimer, the term of this patent is extended or adjusted under 35 U.S.C. 154(b) by 167 days.

(21) Appl. No.: 18/318,045

(22) Filed: May 16, 2023

(65) Prior Publication Data

US 2023/0304936 A1  Sep. 28, 2023

Related U.S. Application Data

(63) Continuation-in-part of application No. PCT/CN2022/080361, filed on Mar. 11, 2022.

(30) Foreign Application Priority Data

Jan. 24, 2022  (CN) .......................... 202210077527.9

(51) Int. Cl.
 *G01N 21/71*  (2006.01)

(52) U.S. Cl.
 CPC ... *G01N 21/718* (2013.01); *G01N 2201/0218* (2013.01); *G01N 2201/023* (2013.01)

(58) Field of Classification Search
 CPC ......... G01N 21/718; G01N 2201/0218; G01N 2201/023
 See application file for complete search history.

(56) References Cited

U.S. PATENT DOCUMENTS

2017/0196444 A1  7/2017  Pyun et al.

FOREIGN PATENT DOCUMENTS

| CN | 110220884 A | * | 9/2019 | ............. G01N 21/01 |
| CN | 110426375 A | | 11/2019 | |

(Continued)

*Primary Examiner* — Jamil Ahmed
(74) *Attorney, Agent, or Firm* — NKL Law; Allen Xue

(57) ABSTRACT

An online detection device underwater elements includes an LIBS system in a sealing pressure chamber and an external airflow control system. The airflow control system has a gas probe bin and a gas source. An opening is formed at one end of the gas probe bin while the other end and the sealing pressure chamber are hermetically partitioned through a glass window. A laser in the LIES system outputs laser to an underwater object surface to be detected for generating plasma spectra. A spectrometer collects plasma spectra returned along an original optical path. When the device operates in water, the balance gas storage tank produces gas with the same pressure as underwater. A flow model is invoked according to the current water pressure to accurately control the air flow rate to form a stable gas environment in the gas probe, which improves the plasma excitation and collection efficiency.

9 Claims, 2 Drawing Sheets

(56) References Cited

FOREIGN PATENT DOCUMENTS

| | | | |
|---|---|---|---|
| CN | 110987902 A | 4/2020 | |
| CN | 111912831 A * | 11/2020 | ........... G01N 21/718 |
| CN | 213482072 U | 6/2021 | |
| EP | 3640626 A1 | 4/2020 | |

* cited by examiner

```
┌─────────────────────────────────────────────────────────────────┐
│   Placing an overall system in a high-pressure laboratory module under a │
│   laboratory environment; changing water pressure; monitoring current water │
│   pressure by a pressure sensor; regulating the air supply by controlling a flow │
│   control valve; observing underwater bubbles that emerge through a video │
│   acquisition camera; and establishing an underwater stable flow model of water │
│   pressure and control valve opening under the condition that the bubbles are │
│                 stable and a few bubbles are discharged         │
└─────────────────────────────────────────────────────────────────┘
                                  ↓
┌─────────────────────────────────────────────────────────────────┐
│   During detection, opening a gas flow valve, supplying gas into a gas probe │
│  through a gas supply device, and draining the water in the gas probe by the gas │
│            through a vent hole in the front end of a probe      │
└─────────────────────────────────────────────────────────────────┘
                                  ↓
┌─────────────────────────────────────────────────────────────────┐
│  Monitoring water pressure outside a gas probe bin by a controller through the │
│    pressure sensor, invoking a prefabricated flow model and regulating the air │
│    supply by controlling the opening of the flow control valve according to the │
│   current water pressure so that a stable air pressure environment is maintained │
│                          in the gas probe bin                   │
└─────────────────────────────────────────────────────────────────┘
                                  ↓
┌─────────────────────────────────────────────────────────────────┐
│    Controlling a laser, a spectrometer, etc. by a control module in a sealing │
│   pressure chamber to start underwater in-situ online detection, to obtain LIBS │
│                               spectral data                     │
└─────────────────────────────────────────────────────────────────┘
                                  ↓
┌─────────────────────────────────────────────────────────────────┐
│     Analyzing the obtained LIBS spectral data through the control module or │
│  uploading to a remote data server through a communication cable for analysis, │
│             to obtain the type and relative content of target elements │
└─────────────────────────────────────────────────────────────────┘
```

FIG. 2

ONLINE DETECTION DEVICE AND METHOD FOR UNDERWATER ELEMENTS BASED ON LIBS TECHNOLOGY

TECHNICAL FIELD

The present invention relates to the field of spectral analysis, in particular to an in-situ online detection device and method for underwater target element components by a laser induced breakdown spectroscopy technology.

BACKGROUND

A Laser Induced Breakdown Spectroscopy (LIBS) technology uses laser light for exciting a target substance to form plasma. When excited atoms, ions or molecules in the plasma are transitioned to a low energy level or a ground state, photons of specific energy are emitted outward to form characteristic spectra. The characteristic spectra are analyzed to obtain the chemical composition of the analyzed substance. The LIBS technology is a technology for direct rapid, contactless and in-situ analysis for multiple elements in an extreme environment. However, in the process of underwater LIBS online detection, the absorption and scattering effects for light by water, a quenching effect of water, a dynamic breakdown effect, etc. all have adverse effects on optical signal excitation and spectrum collection. It is necessary to improve the convergence accuracy while reducing laser energy to prevent water breakdown, so as to increase local power density. However, the reduction of energy will weaken spectral signals, and too high convergence accuracy will cause the spectral signals to be extremely sensitive to a detection distance, thereby greatly affecting the practical application of the underwater LIBS online detection technology. An LIBS detection optical path is changed from an original water environment to a gas environment through air blowing and water drainage, which can effectively improve the plasma excitation and collection efficiency. However, in the field of marine LIBS online detection, the water depth of a detection environment is thousands of meters, and the water pressure can reach tens of megapascals. Under such a high pressure environment, it is difficult to provide enough high pressure gas and provide a stable gas detection environment. Therefore, the above problems need to be solved urgently.

SUMMARY

In view of the defects of the prior art, the present invention provides an underwater online detection device and method with high sensitivity and easy operation based on LIBS technology. A balance gas storage tank produces gas with the same pressure as underwater, and a flow model is invoked according to the current water pressure to accurately control the flow rate of airflow under a water environment, so that a stable gas environment is formed in a gas probe, so as to greatly improve the plasma excitation and collection efficiency, without complicated precision focusing process, and improve the sensitivity of in-situ online detection of underwater solid or water chemical elements.

The technical solution adopted by the present invention for realizing the above purpose is: an online detection device for underwater elements based on LIBS technology comprises a sealing pressure chamber, an LIBS system arranged in the sealing pressure chamber and an external airflow control system; the LIBS system is used for exciting and collecting laser induced breakdown spectroscopy signals; and the airflow control system is used for generating an underwater gaseous detection optical path.

The airflow control system and the sealing pressure chamber are hermetically partitioned through a glass window.

The airflow control system comprises a gas probe bin and a gas source; the gas source is connected with the gas probe bin through a gas source pipeline; an opening at one end of the gas probe bin is used for laser output and water vapor discharge; and a gaseous environment is formed within a range from the front end of an LIBS detection system to a detection object. The gas source contains an airbag and a piston. Seawater pushes the piston to make the internal air pressure of the airbag identical with external water pressure, and the high pressure gas is drawn out through an air pump.

The airflow control system further comprises a pressure sensor arranged outside the gas probe bin, and a flow control valve arranged on the gas source pipeline; the pressure sensor is used for detecting water pressure outside the gas probe bin, and the flow control valve is used for controlling the flow of the gas source. A controller monitors the current water pressure and invokes a prefabricated flow model to accurately control the opening of the flow control valve.

The LIBS system comprises an optical path unit and an excitation and acquisition control unit; the excitation and acquisition control unit is used for triggering an internal laser to output laser light to pass through the optical path of the optical unit, the glass window, the opening at one end of the gas probe bin and an underwater object surface to be detected successively, and collecting plasma spectra returned along an original optical path.

The excitation and acquisition control unit comprises a controller, a laser and a spectrometer; and the controller outputs a signal for controlling the laser to output laser light and controlling the spectrometer to collect the plasma spectra.

The optical path unit is provided with a focusing lens in the incidence direction of a laser optical path, so that the laser is focused on the optical path outside the opening at one end of the gas probe bin, and the plasma spectra return along the optical path, pass through a collection lens, and then converge into the spectrometer; the focusing lens is arranged on a linear module; a motor on the linear module is connected with the controller; and the motor rotates to drive the focusing lens to move along the direction of the optical path on the linear module, so as to change focal length and focus the laser light on the object surface to be detected.

A video acquisition camera is also arranged in the sealing pressure chamber for observing the image pictures inside a gaseous optical path and uploading to the controller.

The device further comprises:

The controller forwards the collected plasma spectral data to an upper computer, or analyzes the collected plasma spectral data to obtain the type and relative content of chemical elements in current underwater solid or water to be detected.

Further, the excitation and acquisition control unit further comprises a time sequence controller connected with the controller, the laser and the spectrometer respectively for triggering the laser and the spectrometer respectively according to a preset time sequence of the controller for operation.

The optical path unit comprises a dichroscope and a focusing lens arranged successively in the incidence direction of the laser optical path, so that the laser is focused on the optical path outside the opening at one end of the gas probe bin, and the plasma spectra return along the optical path and are reflected by the dichroscope and then converged by the collection lens into the spectrometer; The dichroscope is used for transmitting the laser emitted by the laser, and simultaneously reflecting the plasma spectra for collection by the spectrometer.

Further, the sealing pressure chamber further internally comprises a power module, or a power supply connected to the outside.

An underwater online detection method based on LIB S technology for the online detection device for underwater elements based on LIBS technology is provided. The underwater online detection method based on LIBS technology shall comprise the following steps:

the step of establishing the flow model: placing an overall system in a high-pressure laboratory module under a laboratory environment; changing water pressure; monitoring the current water pressure by the pressure sensor; regulating the air supply by controlling the flow control valve; observing underwater bubbles that emerge through the video acquisition camera; and establishing an underwater stable flow model of water pressure and control valve opening under the condition that the bubbles are stable and a few bubbles are discharged;

the step of air blowing and water drainage: detecting a current water pressure value by the pressure sensor in real time; opening the air pump and the flow control valve, supplying gas into the gas probe bin through the gas source, and draining the water in the gas probe by the gas through a vent hole in the front end of the probe;

the step of stabilizing an air pressure environment: monitoring water pressure outside the gas probe bin by the controller through the pressure sensor, invoking a prefabricated flow model and regulating the air supply by controlling the opening of the flow control valve according to the current water pressure so that a stable air pressure environment is maintained in the gas probe bin;

the step of excitation and acquisition: controlling, by the controller in the sealing pressure chamber, the laser to output laser light to pass through the optical path of the optical unit, the glass window, the opening at one end of the gas probe bin and the irradiated underwater object surface to be detected, and controlling the spectrometer to collect plasma spectral data into the controller.

Further, the method further comprises the following steps: forwarding, by the controller, the collected plasma spectral data to an upper computer, or analyzing the collected plasma spectral data to obtain the type and relative content of chemical elements in current underwater solid or water to be detected.

Further, the method further comprises: outputting instructions by the controller to control the video acquisition camera to collect the image pictures of the gaseous optical path in the sealing pressure chamber.

The present invention has the following beneficial effects and advantages:

When the device is operated in water, the balance gas storage tank produces gas with the same pressure as underwater, and the flow model is invoked according to the current water pressure to accurately control the flow rate of airflow under a water environment, so that a stable gas environment is formed in a gas probe, so as to greatly improve the plasma excitation and collection efficiency, without complicated precision focusing process, and improve the sensitivity of in-situ online detection of underwater solid or water chemical elements.

DESCRIPTION OF DRAWINGS

FIG. 2 is a flow chart of a method of the present invention.

Figure 1:
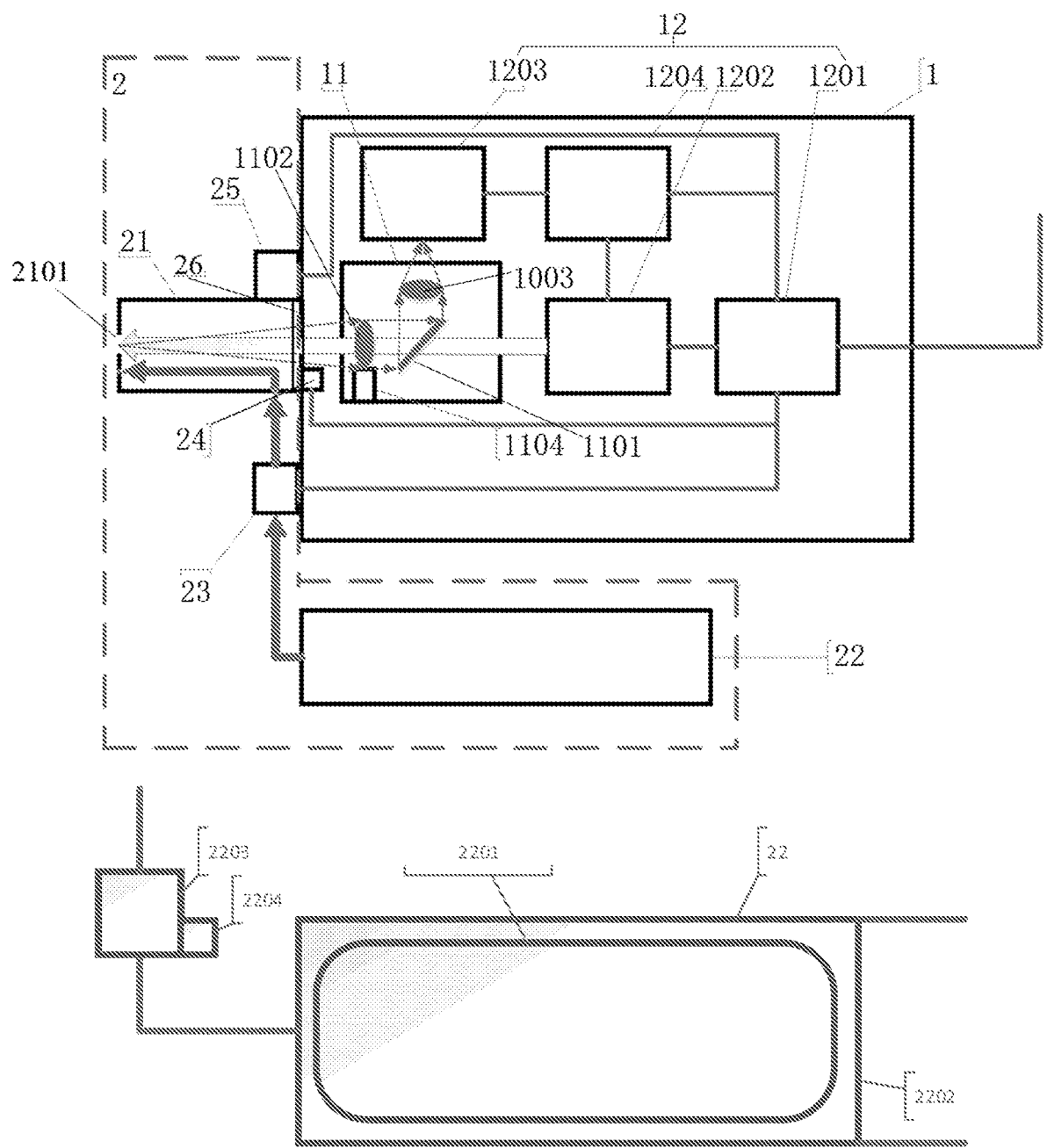
FIG. 1 is a structural schematic diagram of a device of the present invention.

Wherein 1 sealing pressure chamber; 11 optical path unit; 1101 dichroscope; 1102 focusing lens; 1103 collection lens; 1104 linear module; 12 excitation and acquisition control unit; 1201 controller; 1202 laser; 1203 spectrometer; 1204 time sequence controller; 2 airflow control system; 21 gas probe bin; 22 gas source; 2201 airbag; 2202 piston; 2203 air pump; 2204 air pressure sensor; 23 flow control valve; 24 video acquisition camera; 25 pressure sensor; 26 glass window.

DETAILED DESCRIPTION

To make the purpose, the technical solution and the beneficial effects of the present invention more clear, the present invention will be further described below in detail in combination with the examples. It should be understood that specific embodiments described herein are only used for explaining the present invention, not used for limiting the present invention. The present invention will be described in detail below in combination with the drawings.

In view of the existing technical problems, the present invention provides an online detection device and method for underwater elements based on LIBS technology.

The device comprises a sealing pressure chamber 1 and an airflow control system 2. An LIBS system in the sealing pressure chamber 1 is used for exciting and collecting laser induced breakdown spectroscopy signals; and the airflow control system 2 is used for generating an underwater gaseous detection optical path. The LIBS system comprises an optical path unit 11 and an excitation and acquisition control unit 12; a laser in the excitation and acquisition control unit 12 outputs laser light to pass through the optical path assembly of the optical unit 12, the glass window 26, the opening 2101 at one end of the gas probe bin 21 and an underwater object surface to be detected successively to generate plasma spectra, and the spectrometer in the excitation and acquisition control unit 12 collects plasma spectra returned along an original optical path. The excitation and acquisition control unit 12 comprises a controller 1201, and a laser 1202, a spectrometer 1203 and a time sequence controller (1204) which are connected with the controller. The optical path unit 11 comprises a dichroscope and a focusing lens 1102 arranged successively in the incidence direction of the laser optical path, so that the laser is focused on the object surface to be detected outside the opening 2101 at one end of the gas probe bin 21, and the plasma spectra excited on the object surface to be detected return along the optical path, are reflected by the dichroscope, pass through a collection lens 1103, and then converge into the spectrometer 1203. The focusing lens 1102 is arranged on a linear module 1104; a motor on the linear module 1104 is connected with the controller 1201; and the motor rotates to drive the focusing lens 1102 to move along the direction of the optical path on the linear module 1104, so as to change focal length and focus the laser light on the object surface to be detected. The airflow control system 2 comprises a gas probe bin 21 and a gas source 22; the gas source 22 is connected with the gas probe bin 21 through a gas source pipeline; an opening 2101 is formed at one end of the gas probe bin 21, and the other end and the sealing pressure chamber 1 are hermetically partitioned through a glass window 26. A flow control valve 23 is arranged on the gas source pipeline. The flow control valve 23 is connected with the controller 1201, and a pressure sensor 25 is arranged outside the gas probe bin 21, which is connected with the controller 1201. The gas source 22 contains an airbag 2201, a piston 2202, an air pump 2203 and an air pressure sensor 2204. A video acquisition camera 24 is also arranged in the sealing pressure chamber (1). A power module, or a power supply connected to the outside are also arranged in the sealing pressure chamber. The pressure sensor 25 is connected with the controller 1201 in the sealing pressure chamber 1 through a watertight cable. The gas supply pipeline is a pressure-proof gas pipe. The power module is connected with the external power supply through the watertight cable.

During work, firstly, an underwater manipulator controls the detection system, so that the front end of the gas probe bin 21 is attached to the surface of the target to be detected. The external pressure of the gas probe bin 21 is detected by the controller 1201 through the pressure sensor 25, and a prefabricated flow model is invoked to accurately control the opening of the flow control valve 23 so that a stable gas environment is formed in the gas probe. The controller 1201 controls the laser 1202 to emit high energy pulse laser light, and the laser light passes through the optical path assembly in the optical path unit 11, penetrates through the glass window and the gas probe bin 21, and converges on the surface of the target to be detected to generate plasma. The plasma emission light enters the optical path in the optical path unit 11 through the gas probe bin 21 and is coupled to the spectrometer by an internal lens group. The linear module 1104 is used for adjusting the convergence focal length; the time sequence controller 1204 is used for controlling interval time between the laser 1202 and the spectrometer 1203; the video acquisition camera 24 is used for observing the detecting situation. The spectral line data collected by the spectrometer 1203 is uploaded to a remote data server by the controller 1201 for analysis, so as to realize the in-situ online detection of underwater target element components.

As shown in FIG. 1, the online detection device for underwater elements based on LIBS technology provided by the present invention comprises:

the sealing pressure chamber 1 which is made of titanium alloy and has an appearance of a cylindrical structure to prevent water corrosion and withstand high pressure. A quartz optical window 26 is arranged outside the pressure chamber and connected with the gas probe bin 21 for exciting plasma and collecting spectral signals. At the same time, a waterproof cable interface is arranged outside the pressure chamber 1 for connecting an external sensor with water equipment for communication and power supply. The controller 1201 is arranged in the sealing pressure chamber 1. The controller 1201 is a device such as an industrial personal computer used for control, calculation and data communication. The industrial personal computer can directly analyze the spectral data and upload the analysis results to the remote server. A CPU thereof is a quad Core processor, and the main frequency should be higher than 1.8 GHz. The system memory should be higher than 4G. A pulse laser 1202 is arranged in the sealing pressure chamber 1 for plasma excitation. An optical fiber laser with minimal divergence angle is selected as the laser, and has characteristic parameters: output wavelength of 1064 nm, single pulse energy of 1-3 mJ, and frequency of 10-40 KHz. The time sequence controller 1204 is arranged in the sealing pressure chamber 1, and can be used to precisely control opening time between the pulse laser 1202 and the spectrometer 1203. The time range comprises 1 µs-10 µs, and the time control accuracy is 10 ns. The spectrometer 1203 is arranged in the sealing pressure chamber 1. The spectrum collection range of the spectrometer 1203 should be between 160 nm and 1200 nm, and the incident light ray is directly coupled into the slit of the spectrometer or imported through an optical fiber. The linear module 1104 is arranged in the sealing pressure chamber 1, and can quickly adjust the focal length of the lens group inside the optical path unit 11, so that the pulse laser light is focused on the analysis surface of the target to be detected. Due to the beneficial effects of this patent, no precise focusing is required, focusing accuracy is 0.1 mm, and focusing speed is less than 10 seconds. The power module is arranged in the sealing pressure chamber 1, and can output 5V and 24V DC voltage stably with total power output of 1000 W, or is connected with an external DC power supply.

The external airflow control system 2 comprises a pressure sensor 25, a gas probe bin 21, an air pressure sensor 2204, a flow control valve 23, a gas supply pipeline and a gas source. The detection range of the pressure sensor 25 should be suitable for the detection depth of water, such as detection depth of 6000 m, and the maximum pressure range should be higher than 60 MPa. The flow control valve 23 is used for controlling the flow rate of underwater airflow. In practical detection, the flow rate of the airflow under a steady state is less than 0.5 L/min. The gas source 22 contains an airbag 2201 and a piston 2202, and the internal air pressure is equal to external water pressure. The gas probe bin 21 is a hollow cylindrical structure made of titanium alloy. A rubber guard ring is arranged at the front end to avoid impacting and damaging the detected object.

During work, firstly, the underwater manipulator holds the detection system, so that the front end of the gas probe bin 21 is attached to the surface of the target to be detected. The advance speed of the manipulator should be not higher than 0.5 m/s. The external pressure of the gas probe bin 21 is detected by the controller 1201 through the pressure sensor 25, and a prefabricated flow model is invoked to accurately control the opening of the flow control valve so that a stable gas environment is formed in the gas probe. The controller module 1201 controls the laser 1202 to emit high energy pulse laser light, and the laser light passes through the optical path assembly of the optical path unit 11, penetrates through the glass window 26 and the gas probe bin 21, and converges on the surface of the target to be detected to generate plasma. The plasma emission light enters the optical path unit 11 through the gas probe bin 21 and is coupled to the spectrometer 1203 by the internal lens group. The linear module 1104 is used for adjusting the convergence focal length; the time sequence controller 1204 is used for controlling interval time between the laser 1202 and the spectrometer 1203; and the video acquisition camera 24 is used for observing the detecting situation. The spectral line data collected by the spectrometer 1203 is uploaded to a remote data server by the controller 1201 for analysis, so as to realize the in-situ online detection of underwater target element components.

The gas probe bin 21 has pressure resistance, and can keep the structural shape of the internal gaseous optical path unchanged under a high pressure environment. The front end of the probe is provided with a vent hole 2101, to ensure no bubble interference in the detection position. The front end of the probe is provided with a flexible material to avoid damaging the detection target due to impact. The entire interior of the gas probe bin 21 up to the analysis surface of the target to be detected in contact with the front end is in a gas environment state. The types of the supply gas source are gases of helium, neon, argon, nitrogen and air. The pulse laser 1202 can be a conventional laser or an optical fiber laser with minimal divergence angle. The linear module 1104 is arranged in the optical path unit 11, and can quickly adjust the focal length of the lens group inside the optical path unit 11, so that the pulse laser light is focused on the surface of the target to be detected.

As shown in FIG. 2, the online detection method for underwater elements based on LIBS technology provided by the present invention comprises the following steps:

placing an overall system in a high-pressure laboratory module under a laboratory environment; changing water pressure; monitoring the current water pressure by the pressure sensor (25); regulating the air supply by controlling the flow control valve (23); observing underwater bubbles that emerge through the video acquisition camera (24); and establishing an underwater stable flow model of water pressure and control valve opening under the condition that the bubbles are stable and a few bubbles are discharged;

obtaining a current water pressure value by the pressure sensor 25, opening the flow control valve 23, supplying gas into the gas probe bin 21 through the gas supply device 22, and draining the water in the gas probe bin 21 by the gas through the vent hole in the front end of the probe;

monitoring water pressure outside the gas probe bin (21) by the controller (1201) through the pressure sensor (25), invoking a prefabricated flow model and regulating the air supply by controlling the opening of the flow control valve (23) according to the current water pressure so that a stable air pressure environment is maintained in the gas probe bin (21);

controlling the laser 1202, the spectrometer 1203, etc. by the controller 1201 in the sealing pressure chamber 1 to start underwater in-situ online detection, to obtain LIBS spectral data;

analyzing the obtained LIB S spectral data through the controller 1201 or uploading to a remote data server through the communication cable for analysis, to obtain the type and relative content of the target elements.

The online detection method for underwater elements based on LIBS technology provided by the present invention can be implemented by those ordinary skilled in the art through other steps. The online detection method for underwater elements based on LIBS technology provided by the present invention in FIG. 2 is only a specific embodiment.

The invention claimed is:

1. An online detection device for underwater elements based on Laser Induced Breakdown Spectroscopy (LIBS) technology, comprising a sealing pressure chamber (1), a LIBS system arranged in the sealing pressure chamber, and an airflow control system (2) disposed external to the sealing pressure chamber, wherein the airflow control system comprises a gas probe bin (21) and a gas source (22) that are fluidly connected through a pipeline, a first end of the gas probe bin has an opening (2101) and a second end of the gas probe bin has a glass window (26) that separates the gas probe bin and the pressure sealing chamber, and wherein, during operation, the gas source supplies a gas to fill the gas probe bin and the LIBS system emits a laser beam that passes through the window, the gas probe bin, and exits from the opening in the gas probe bin.

2. The online detection device according to claim 1, wherein the gas source (22) contains an airbag (2201) and a piston (2202) that is exposed to water external to the airbag and configured to equalize a pressure in the airbag with underwater pressure during operation, wherein an air pump (2203) a first pressure sensor (2204), and a flow control valve (23) are disposed on the pipeline.

3. The online detection device according to claim 1, wherein the airflow control system (2) further comprises a second pressure sensor (25) arranged outside the gas probe bin (21) for detecting water pressure outside the gas probe bin (21), and a controller (1201) that is signally connected to the second pressure sensor to control the flow control valve (23).

4. The online detection device according to claim 1, wherein the LIBS system comprises an optical path unit (11) having an optical path assembly and an excitation and acquisition control unit (12) comprising a controller (1201), and a laser (1202), a spectrometer (1203) and a time sequence controller (1204), which are signally connected with the controller, wherein, during operation, the controller (1201) controls the laser (1202) to output an laser beam and the spectrometer (1203) to collect the plasma spectral data and the time sequence controller (1204) is configured to control a working time sequence of the laser (1202) and the spectrometer (1203).

5. The online detection device according to claim 4, wherein, during operation, the laser beam to successively pass through the optical path assembly, the glass window (26), the gas probe bin, the opening (2101) to irradiate a surface of an object to be detected to generate plasma, and wherein the spectrometer (1203) in the excitation and acquisition control unit (12) collects the plasma spectral data.

6. The online detection device according to claim 5, wherein the optical path unit (11) comprises a focusing lens (1102) arranged in the incidence direction of the laser beam and configured to focus the laser beam the surface of the object to be detected, and the excited plasma spectra return along the optical path, are reflected by a dichroscope (1101), pass through a collection lens (1103), and then converge into the spectrometer (1203), wherein the focusing lens (1102) is arranged on a linear module (1104) having a motor on connected with the controller (1201); and the motor is configured to drive the focusing lens (1102) to move along a direction of the optical path on the linear module (1104), so as to focus the laser beam on the surface of the object to be detected.

7. The online detection device according to claim 4, wherein a video acquisition camera (24) is also arranged in the sealing pressure chamber (1) for observing image pictures inside a gaseous optical path and uploading to the controller (1201).

8. An underwater online detection method, comprising:

a step of establishing a flow model, which includes:

placing the online detection device according to claim 3 underwater in a high-pressure laboratory module under a laboratory environment;

changing water pressure;

monitoring the current water pressure by the second pressure sensor (25);

regulating a gas supply from the gas source by controlling the flow control valve (23);

observing underwater bubbles that emerge through the video acquisition camera (24); and establishing an underwater stable flow model of water pressure and control valve opening under the condition that the bubbles are stable and a few bubbles are discharged;

a step of air blowing and water drainage, which includes:

detecting a current water pressure value by the second pressure sensor (25) in real time;

opening the air pump (2203) and the flow control valve (23), supplying the gas from the gas source (22) into the gas probe bin (21) through and draining water in the gas probe (21) by the gas through the opening hole (2101);

a step of stabilizing an air pressure environment, which includes:

monitoring water pressure outside the gas probe bin (21) by the controller (1201) through the second pressure sensor (25), regulating the air supply by controlling the opening of the flow control valve (23) according to the underwater stable flow model and the current water pressure so that a stable air pressure environment is maintained in the gas probe bin (21);

a step of excitation and acquisition, which includes:

controlling, by the controller (1201) in the sealing pressure chamber (1), the laser (1202) to output the laser beam to irradiate the surface of the object to be detected, and controlling the spectrometer (1203) to collect plasma spectral data into the controller (1201).

9. The method according to claim 8, wherein the controller (1201) transmits the collected plasma spectral data to a computer, or analyzes the collected plasma spectral data to obtain information of chemical elements in the object being detected.

\* \* \* \* \*